July 11, 1961     A. J. MONTALBANO     2,991,899

ASSEMBLIES OF FLANGED ARTICLES AND THE MANUFACTURE THEREOF

Filed Aug. 12, 1959

INVENTOR
ANTHONY J. MONTALBANO

*Richard A. Craig*

ATTORNEY

United States Patent Office 2,991,899
Patented July 11, 1961

2,991,899
ASSEMBLIES OF FLANGED ARTICLES AND THE MANUFACTURE THEREOF
Anthony J. Montalbano, River Grove, Ill., assignor to Elastic Stop Nut Corporation of America, Union, N.J., a corporation of New Jersey
Filed Aug. 12, 1959, Ser. No. 833,294
6 Claims. (Cl. 220—4)

This invention relates to assemblies of flanged articles and to the manufacture of such assemblies. More specifically the invention relates to a watertight assembly of two flanged members, such as lenses, of light transmitting thermoplastic material and to a method of making the same.

The invention may be embodied in the optical system of a bi-directional turn signal indicator for use on trucks. A prior optical system for a bi-directional truck turn signal indicator has involved, in addition to two lenses of thermoplastic material, a relatively expensive metal housing and gaskets for keeping out water. The present invention eliminates the gaskets and substitutes for the housing a relatively much smaller retainer ring, thus resulting in a substantial reduction in material cost.

Furthermore, the present invention makes possible reduced assembly costs, weight reduction and improved appearance with respect to prior assemblies.

In addition, prior gasketed assemblies have proven to be something less than completely reliable as to watertightness, wheras the present invention overcomes this defect.

In the prior assembly referred to the housing prevents a signal from being projected from the assembly at right angles to the axis of the lenses. The present invention overcomes this.

In broad terms, an assembly embodying the invention comprises first and second members having confronting first and second flange surfaces, respectively, the first member having a first external annular groove spaced from the first flange surface, the second member having a second external annular groove spaced from the second flange surface, and a ring having first and second internal rims in the first and second grooves, respectively, to hold the members together.

In its method aspect the invention broadly includes the steps of providing a first member having a first flange surface and a second member having a second flange surface, providing a metal ring having first and second internal rims, placing the members and the ring with the flange surfaces confronting each other and with the first rim engaging the first member and the second rim engaging the second member and thereafter simultaneously heating the ring and causing the first and second rims to penetrate an ddeform and embed themselves in the first and second members, respectively.

Important objects of the invention are to provide an assembly and a method of making the same having the advantages referred to above.

The above and additional objects and advantages will become apparent from the following description of an example of each aspect of the invention and the accompanying drawings thereof wherein.

Figure 1:
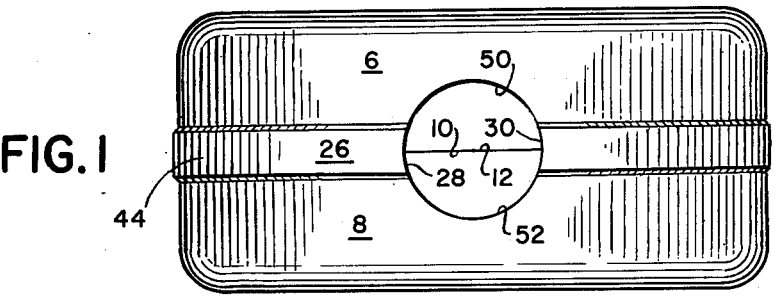
FIG. 1 is a view in side elevation of an assembly embodying the invention, showing the two members and the ring.
Figure 2:
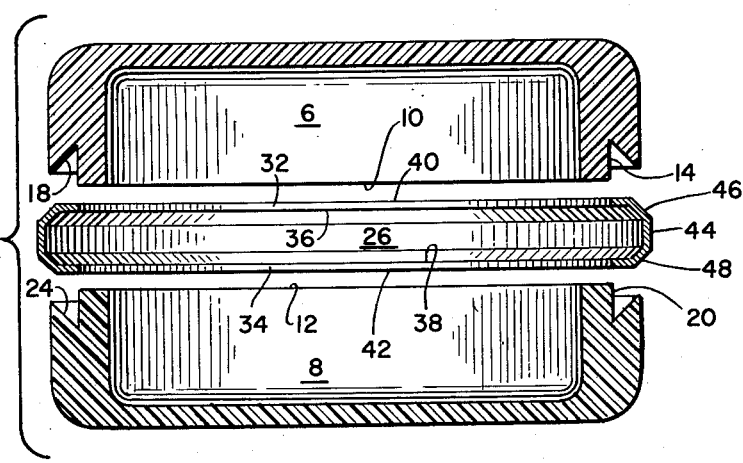
FIG. 2 is a view in section of the members and ring of FIG. 1 prior to the performance of any assembly operations.

The assembly of FIG. 1 comprises first and second coaxial circular members 6 and 8 respectively, which will hereinafter by way of example be assumed without limitation to be lenses of light transmitting thermoplastic material. For simplicity no optical details of lenses 6 and 8 are shown.

Lenses 6 and 8 have confronting abutting first and second flat flange surfaces 10 and 12, respectively.

Lens 6 also includes a first external annular cylindrical surface 14 intersecting flange surface 10 at the outer periphery thereof, a first external annular groove 16 (FIG. 4) axially spaced from flange surface 10 and having a first groove surface (FIG. 4) parallel to and facing away from flange surface 10 and a second groove surface (FIG. 4) parallel to and facing flange surface 10 and the first groove surface.

Lens 6 further has a first frusto-conical skirt surface 18 overlapping and confronting groove 16 and annular surface 14.

Lens 8 includes a second external annular cylindrical surface 20 of the same diameter as surface 14 and intersecting flange surface 12 at the outer periphery thereof, a second external annular groove 22 (FIG. 14) axially spaced from flange surface 12 and having a third groove surface (FIG. 4) parallel to and facing away from flange surface 12 and a fourth groove surface (FIG. 4) parallel to and facing flange surface 12 and the third groove surface.

Lens 8 further has a second frusto-conical skirt surface 24 overlapping and confronting groove 22 and annular surface 20.

The assembly also includes a resilient sheet metal ring 26 having first and second confronting ends 28 and 30 having a circumferential gap therebetween (FIG. 1) and first and second internal rims 32 and 34, respectively. Rims 32 and 34 have first and second confronting rim surfaces 36 and 38, respectively, and third and fourth rim surfaces 40 and 42, respectively. Surfaces 40 and 42 face away from each other.

Rim 32 is in groove 16 with rim surfaces 36 and 40 in snug, watertight engagement with the first and second groove surfaces, respectively, and rim 34 is in groove 22 with rim surfaces 38 and 42 in snug, watertight engagement with the third and fourth groove surfaces, respectively.

Ring 26 also has an annular central portion 44 and first and second external tapered surfaces 46 and 48 joining portion 44 and rims 32 and 34, respectively.

The engagements of rim 32 and groove 16 and of rim 34 and groove 22 effectively hold lenses 6 and 8 together, but, as will be pointed out, ring 26 is, in the assembly of Fig. 1, under radial compression. Consequently, in order to assure that rims 32 and 34 stay in grooves 16 and 22, respectively, skirt surfaces 18 and 24 are in snug, watertight engagement with tapered surfaces 46 and 48, respectively.

To permit entry of a light source into the space between lenses 6 and 8, lenses 6 and 8 have first and second confronting arcuate recesses 50 and 52 respectively, therethrough and recesses 50 and 52 are in registry with the gap between ends 28 and 30 of ring 26.

Figures 3, 4:
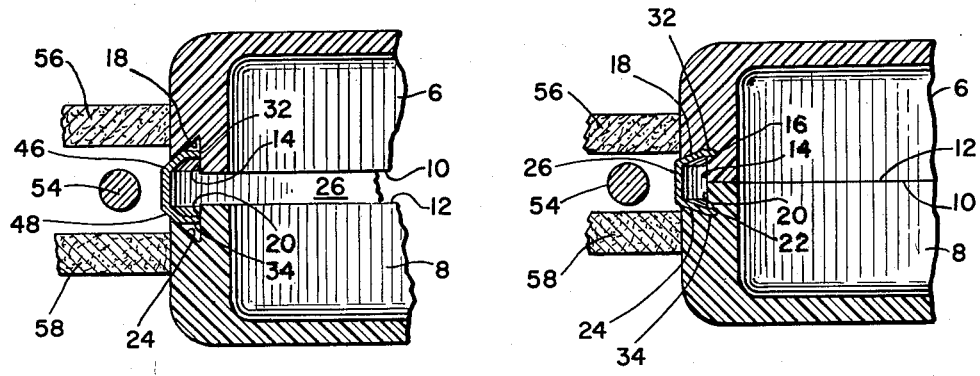
FIG. 3 is a view in fragmentary section of the members and the ring of FIG. 1 in preliminarily assembled relationship and also showing certain additional elements used in making the assembly of FIG. 1.
FIG. 4 is a view similar to FIG. 3 but showing the parts at the completion of the assembly operations performed with the aid of the additional elements of FIG. 3.

Attention will next be directed to a method of making the assembly of FIG. 1. To carry out the method, lenses 6 and 8 and ring 26 are provided as shown in FIGS. 3 and 4 and as described above. It should be noted that when ring 26 is in its unstressed state the inside diameter of rims 32 and 34 is substantially equal to the diameter of surfaces 14 and 20 and the outside diameter of rim surfaces 40 and 42 is less than the maximum diameter of skirt surfaces 18 and 24.

Lenses 6 and 8 and ring 26 are next placed as shown in FIG. 3, with flange surfaces 10 and 12 confronting and spaced from each other, with the inner periphery of rim 32 engaging annular surface 14, with the inner periphery of rim 34 engaging annular surface 20 and with skirt surfaces 18 and 24 engaging tapered surfaces 46 and 48, respectively, all as shown in FIG. 3.

Thereafter and simultaneously, ring 26 is heated to cause localized softening of those parts of lenses 6 and 8 engaged by ring 26 and flange surfaces 10 and 12 and skirt surfaces 18 and 24 are caused to undergo relative movement toward each other, as by squeezing lenses 6 and 8 together. This relative movement of skirt surfaces 18 and 20 causes ring 26 to contract resiliently radially in turn to cause rims 32 and 34 to penetrate and deform and embed themselves in annular surfaces 14 and 20, respectively. In short, grooves 16 and 22 are formed. The relative movement of lenses 6 and 8 is continued until surfaces 10 and 12 abut each other.

It may be desirable or even necessary externally to confine skirt surfaces 18 and 24 during the relative movement of lenses 6 and 8, in order to prevent outward flow of material of lenses 6 and 8. If the latter occurred, ring 26 might not be contracted and rims 32 and 34 might not deform lenses 6 and 8 as aforesaid.

The heating of ring 26 can be accomplished by means of a high frequency induction field supplied by a coil schematically shown at 54 in FIGS. 3 and 4 and the external confinement of skirt surfaces 18 and 24 can be accomplished conveniently by first and second confining rings 56 and 58, engaging lenses 6 and 8, respectively. Rings 56 and 58 can be, for example, of vulcanized fiber.

The invention in both article and method aspects, is well adapted to the attainment of the objects and advantages set forth above and others.

Since many of the illustrated and described details of the disclosed example of the invention can be changed without departing from the invention, those details are to be taken as exemplary only and not as limitations on the invention, except as the details may be included in the appended claims.

What is claimed is:

1. An assembly comprising first and second members having confronting first and second flat flange surfaces, respectively, said first member including a first external anuular surface intersecting said first flange surface at the outer periphery thereof, a first external annular groove spaced from said first flange surface and having a first groove surface parallel to and facing away from said first flange surface and a second groove surface parallel to and facing said first flange surface, said first member further having a first frusto-conical skirt surface overlapping and confronting said first groove and said first annular surface, said second member including a second external annular surface intersecting said second flange surface at the outer periphery thereof, a second external annular groove spaced from said second flange surface and having a third groove surface parallel to and facing away from said second flange surface and a fourth groove surface parallel to and facing said second flange surface, said second member further having a second frusto-conical skirt surface overlapping and confronting said second groove and said second annular surface, and a resilient sheet metal ring having first and second confronting ends having a circumferential gap therebetween, first and second internal rims having first and second confronting rim surfaces, respectively, and third and fourth rim surfaces, respectively, facing away from each other, said first rim in said first groove, said first and third rim surfaces in snug, watertight engagement with said first and second groove surfaces, respectively, said second rim in said second groove, said second and fourth rim surfaces in snug, watertight engagement with said third and fourth groove surfaces, respectively, said ring further having an annular central portion and first and second external tapered surfaces joining said central portion and said first and second rims, respectively, said first and second skirt surfaces engaging said first and second tapered surfaces, respectively.

2. The invention set forth in claim 1 wherein said members are of light transmitting thermoplastic material.

3. The invention set forth in claim 1 wherein said members are lenses of light-transmitting thermoplastic material and have confronting recesses therethrough in registry with said gap.

4. The method of making an assembly, said method comprising the steps of providing a first thermoplastic member having a first flange surface and a second thermoplastic member having a second flange surface, providing a metal ring having first and second internal rims, placing said members and said ring with said flange surfaces confronting each other and with said first rim engaging said first member and said second rim engaging said second member and thereafter simultaneously heating said ring and causing said first and second rims to penetrate and deform and embed themselves in said first and second members, respectively.

5. The method of making an assembly, said method comprising the steps of providing a first thermoplastic member including a first flat flange surface and a first external annular surface intersecting said first flange surface at the outer periphery thereof and a first annular skirt surface confronting said first external annular surface, providing a second thermoplastic member including a second flat flange surface and a second external annular surface intersecting said second flange surface at the outer periphery thereof and a second annular skirt surface confronting said second external annular surface, providing a resilient sheet metal ring having first and second spaced-apart confronting ends and first and second internal rims, placing said members and said ring with said flange surfaces confronting and spaced from each other and with said first rim engaging said first external annular surface, with said second rim engaging said second external annular surface and with said skirt surfaces engaging said ring and thereafter simultaneously heating said ring and causing said flange surfaces and said skirt surfaces to undergo movement toward each other, said movement of said skirt surfaces causing said ring to contract radially and said first and second rims to penetrate and deform and embed themselves in said first and second external annular surfaces, respectively.

6. The method of making an assembly, said method comprising the steps of providing a first thermoplastic member including a first flat flange surface, a first external annular surface intersecting said first flange surface at the outer periphery thereof and a first frusto-conical skirt surface overlapping and confronting said first annular surface, providing a second thermoplastic member including a second flat flange surface, a second external annular surface intersecting said second flange surface at the outer periphery thereof and a second frusto-conical skirt surface overlapping and confronting said second annular surface, providing a resilient sheet metal ring having first and second spaced-apart ends, first and second internal rims, an annular central portion and first and second external tapered surfaces joining said central portion and said first and second rims, respectively, placing said members and said ring with said flange surfaces confronting and spaced from each other and with said first rim engaging said first external annular surface, with said second rim engaging said second external annular surface and with said first and second skirt surfaces engaging said first and second tapered surfaces, respectively, and thereafter simultaneously heating said ring, causing said flange surfaces and said skirt surfaces to undergo movement toward each other, said movement of said skirt surfaces causing said ring to contract radially and said first and second rims to penetrate and deform and embed themselves in said first and second external annular surfaces, respectively, and externally confining said skirt surfaces during said movement thereof.

References Cited in the file of this patent

UNITED STATES PATENTS

| | | |
|---|---|---|
| 2,048,966 | Perry | July 28, 1936 |
| 2,607,082 | Starke | Aug. 19, 1952 |
| 2,809,399 | Mead | Oct. 15, 1957 |

FOREIGN PATENTS

| | | |
|---|---|---|
| 1,008,197 | Germany | May 9, 1957 |